(12) United States Patent
Yokokura

(10) Patent No.: US 8,049,915 B2
(45) Date of Patent: Nov. 1, 2011

(54) IMAGE PROCESSING APPARATUS, IMAGE PROCESSING METHOD AND STORAGE MEDIUM

(75) Inventor: Hidenori Yokokura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1112 days.

(21) Appl. No.: 11/834,379

(22) Filed: Aug. 6, 2007

(65) Prior Publication Data

US 2008/0152188 A1 Jun. 26, 2008

(30) Foreign Application Priority Data

Dec. 20, 2006 (JP) ................................ 2006-343048

(51) Int. Cl.
*G06F 15/00* (2006.01)
*H04N 13/02* (2006.01)

(52) U.S. Cl. ........................................ 358/1.15; 348/48

(58) Field of Classification Search .................. 358/1.15, 358/1.14, 1.13, 1.16, 1.18, 1.1, 1.9, 1.12, 358/468, 479; 348/48, 231.2, 47; 386/248, 386/329, 332, 225; 382/305, 219, 100

See application file for complete search history.

(56) References Cited

U.S. PATENT DOCUMENTS

| 6,507,330 | B1 | 1/2003 | Handschy et al. |
| 7,239,416 | B2* | 7/2007 | Ohmura et al. ............... 358/1.18 |
| 2002/0031262 | A1* | 3/2002 | Imagawa et al. ............... 382/190 |

FOREIGN PATENT DOCUMENTS

| EP | 854465 A1 | 7/1998 |
| GB | 2429823 A | 3/2007 |
| JP | 2003-023566 A | 1/2003 |
| JP | 2005-175782 A | 6/2005 |
| JP | 2005-210408 A | 8/2005 |
| JP | 2005-229237 A | 8/2005 |

* cited by examiner

*Primary Examiner* — Saeid Ebrahimi Dehkordy
(74) *Attorney, Agent, or Firm* — Canon USA, Inc., I.P. Division

(57) ABSTRACT

An image processing apparatus stores moving image data including a plurality of frames and enables a user to select at least one frame from the plurality of frames included in the moving image data and select a type of processing that is to be performed to the selected frame. The apparatus executes control to perform the selected type of processing to the selected frame. Further, the apparatus manages history information indicating the frame to which the processing is performed and the type of the performed processing.

10 Claims, 16 Drawing Sheets

FIG. 14

| FRAME | PROCESSING TYPE | LAST PROCESSING DATE |
|---|---|---|
| \ Birthday Party.avi 1402 | | |
| 01:26:45:23 | print | 2006/6/15 12:12 |
| 01:26:45:23 | send | 2006/9/30 10:20 |
| 00:26:14:14 | send | 2006/10/1 12:01 |
| 00:02:14:28 | print | 2006/10/23 13:15 |
| 00:02:14:28 | store | 2006/11/2 19:28 |
| 00:02:14:28 | store | 2006/11/5 11:03 |
| 01:56:57:28 | print | 2006/11/26 18:17 |
| 01:56:57:28 | print | 2006/12/2 17:23 |

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus and method for extracting a frame included in moving image data as still image data and performing processing to the extracted frame.

2. Description of the Related Art

In recent years, moving images can be easily captured by digital cameras or digital camcorders. The captured moving image data can be recorded and stored in a recording medium such as a digital versatile disk (DVD) or downloaded to a PC.

The moving image data is composed of a plurality of consecutive frames. That is, moving images are successively captured as plural frames to generate moving image data. Then, a frame of the plural frames constituting the moving image data can be extracted and used as still image data.

For example, a desired scene can be extracted as still image data from moving image data which was captured by a digital camera while traveling. The extracted image can be developed as a printed photograph to be included in a physical travel album. Further, in addition to moving image data captured by a user, a screen frame displayed on TV may be extracted from moving image data sent as information programs, and printed.

However, in such cases, a user needs to perform a troublesome task to retrieve a frame corresponding to a desired scene from a number of frames included in moving image data. In particular, if the moving image data is of long duration, a lot of time can be wasted retrieving a frame which is to be extracted.

To solve the above problems, a printing flag can be previously set to a particular frame in moving image data (see Japanese Patent Application Laid-Open No. 2005-229237, for example).

That is, the printing flag is set to a frame when it is detected that image content is greatly changed between frames, or a predetermined period is elapsed at the time of capturing moving images with a digital camera. The printing flag is intended to help a user to retrieve a desired frame when printing the frame later.

However, if the printing flag is set in the above-described manner, the following problem may occur. That is, in the above-described technique, a flag is automatically set while capturing moving image data, so that the flag is not necessarily set to a frame that the user most likely wants to print.

Further, since the flag is set only based on photographing conditions or contents of moving image data, when a user actually prints a desired frame later, information regarding a printing operation is not retained. That is, after the user extracts still image data from a predetermined frame in moving image data and prints the image, if the user desires to extract and print the same still image data again, a troublesome task needs to be performed to retrieve a desired frame.

SUMMARY OF THE INVENTION

An embodiment of the present invention is directed to an image processing apparatus, method and storage medium, which manage information indicating that processing is performed to still image data which is extracted from a frame in moving image data, in association with the target frame.

According to an aspect of the present invention, an image processing apparatus includes: a memory unit configured to store moving image data; a processing unit configured to perform plural types of processing; a first selecting unit configured to select at least one frame from a plurality of frames included in moving image data stored in the memory unit; a second selecting unit configured to select a type of processing that is to be performed by the processing unit; a control unit configured to control the processing unit to perform the selected type of processing to the selected frame; a management unit configured to manage history information indicating the frame to which the processing is performed by the processing unit and the type of the performed processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 illustrates a history information table according to an exemplary embodiment of the present invention.

DETAILED DESCRIPTION OF THE EMBODIMENTS

Various exemplary embodiments, features, and aspects of the invention will be described in detail below with reference to the drawings.

Hereinafter, exemplary embodiments of the present invention will be described.

First Exemplary Embodiment

Figure 1:
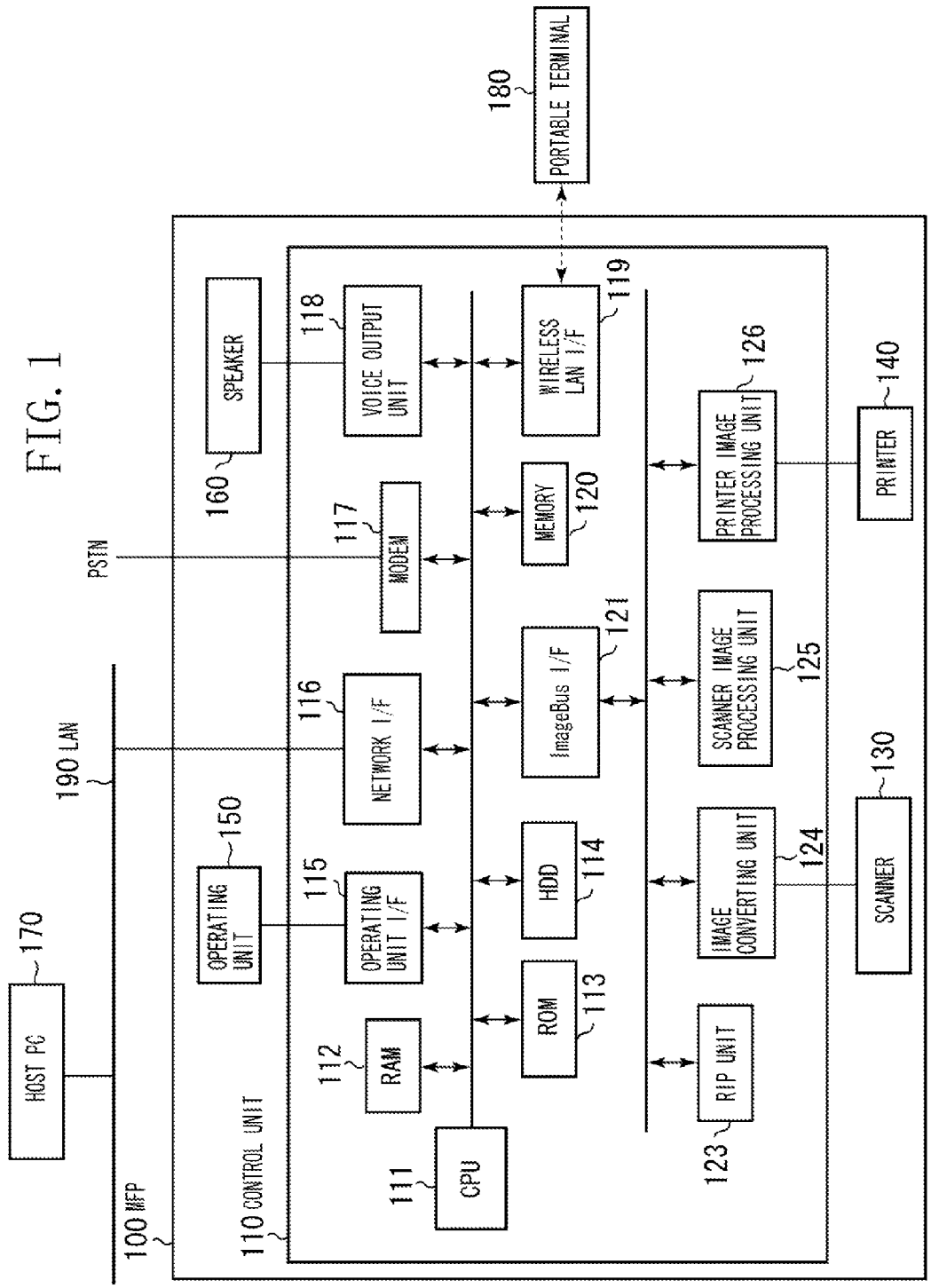
FIG. 1 is a block diagram of a multifunction peripheral (MFP) according to an exemplary embodiment of the present invention.

FIG. 1 is a block diagram of a multifunction peripheral (MFP) 100 serving as an image processing apparatus according to an embodiment of the present invention.

A control unit 110 is connected to a printer 140 (i.e., an image output device) and a scanner 130 (i.e., an image input device), and controls input/output of image information. On the other hand, the control unit 110 is connected to a local area network (LAN) 190 or Public Switched Telephone Networks (PSTN) (i.e., public line) and controls input/output of image information including moving image data or still image data, or device information.

A central processing unit (CPU) 111 controls the MFP 100 and operates in accordance with programs stored in a random access memory (RAM) 112. The RAM 112 is an image memory for temporarily storing image data. A read-only memory (ROM) 113 is a boot ROM and stores a boot program for a system. A hard disk drive (HDD) 114 stores system software, image data, and programs for controlling operations of the MFP 100. The programs stored in the HDD 114 are loaded onto the RAM 112, and the CPU 111 controls operations of the MFP 100 based on the programs.

An operating unit interface (I/F) 115 connects the operating unit 150 to the control unit 110 to output image data to the operating unit 150 on which the image data is displayed. Further, the I/F 115 transmits information input by a user via the operating unit 150 to the CPU 111. A network I/F 116 is connected to the LAN 190 and controls input/output of various types of information. A Modem 117 is connected to the PSTN and controls input/output of image information.

A voice output unit 118 outputs voice information to a speaker 160 when moving image data or voice data stored in the HDD 114 is reproduced. A wireless LAN I/F 119 performs wireless communications such as infrared communications to transmit/receive moving image data or still image data to/from a portable terminal 180 such as a cell phone, a notebook personal computer, or a digital camera. Moving image data or still image data received through the wireless LAN I/F 119 is stored in a user box in the HDD 114 as described below. A memory 120 stores moving image data or still image data similar to the HDD 114, and stores various types of information necessary for executing functions of the MFP 100, such as history information management table as described below. The memory 120 can be a removable external storage device.

An ImageBus I/F 121 controls high-speed input/output of image data through ImageBus. A raster image processor (RIP) unit 123 expands a page description language (PDL) code received from a host PC 170 through the LAN 190 and the network I/F 116, into a bit map image.

A scanner image processing unit 125 performs image correction on image data read from the original by the scanner 130. The printer image processing unit 126 performs image correction on image data output to the printer 140.

An image conversion unit 124 performs image conversion on image data stored in the RAM 112. More specifically, the image conversion unit 124 performs processing such as image rotation or resolution conversion on an image. Moreover, the image conversion unit 124 coverts a binary image to a multilevel image, or a multilevel image to a binary image.

Figure 2:
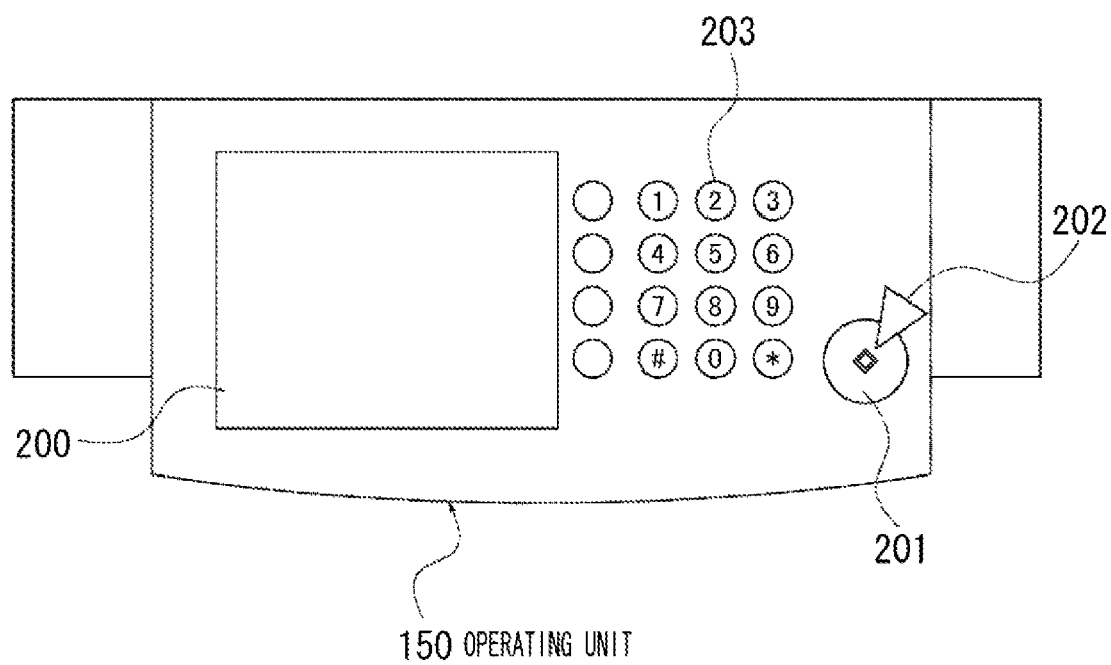
FIG. 2 illustrates an appearance of an operating unit according to an exemplary embodiment of the present invention.

FIG. 2 shows an appearance of the operating unit 150 of the MFP 100. A liquid crystal panel 200 is a liquid crystal display device with a touch panel sheet, and displays an operation screen for performing various settings as well as displays setting information that is input. Further, the liquid crystal panel 200 reproduces or displays moving image data stored in the HDD 114, or displays a preview of still image data. If a user enters instructions with a touch panel, information about a position touched by the user is detected, and a corresponding instruction is sent to the operating unit I/F 115 through the CPU 111.

A start key 201 is a hard key to instruct the scanner 130 to start reading or the printer 140 to start printing. Within the start key 201, green and red LEDs are incorporated and the green LED is turned on when the printer, scanner, or the like is ready to start operations, and the red LED is turned on when operations cannot be started due to errors or the like. A stop key 202 is a hard key to instruct the scanner 130 to stop reading or the printer 140 to stop printing.

A hard key group 203 includes a numeric keypad, a log-in key and a user mode key. The numeric keypad is configured to input numerical values such as the number of copies. The log-in key allows a user to enter a user ID or a password to log in to a target website and the user mode key allows to shift an operational mode to a user mode to perform various types of device settings.

Figure 3:
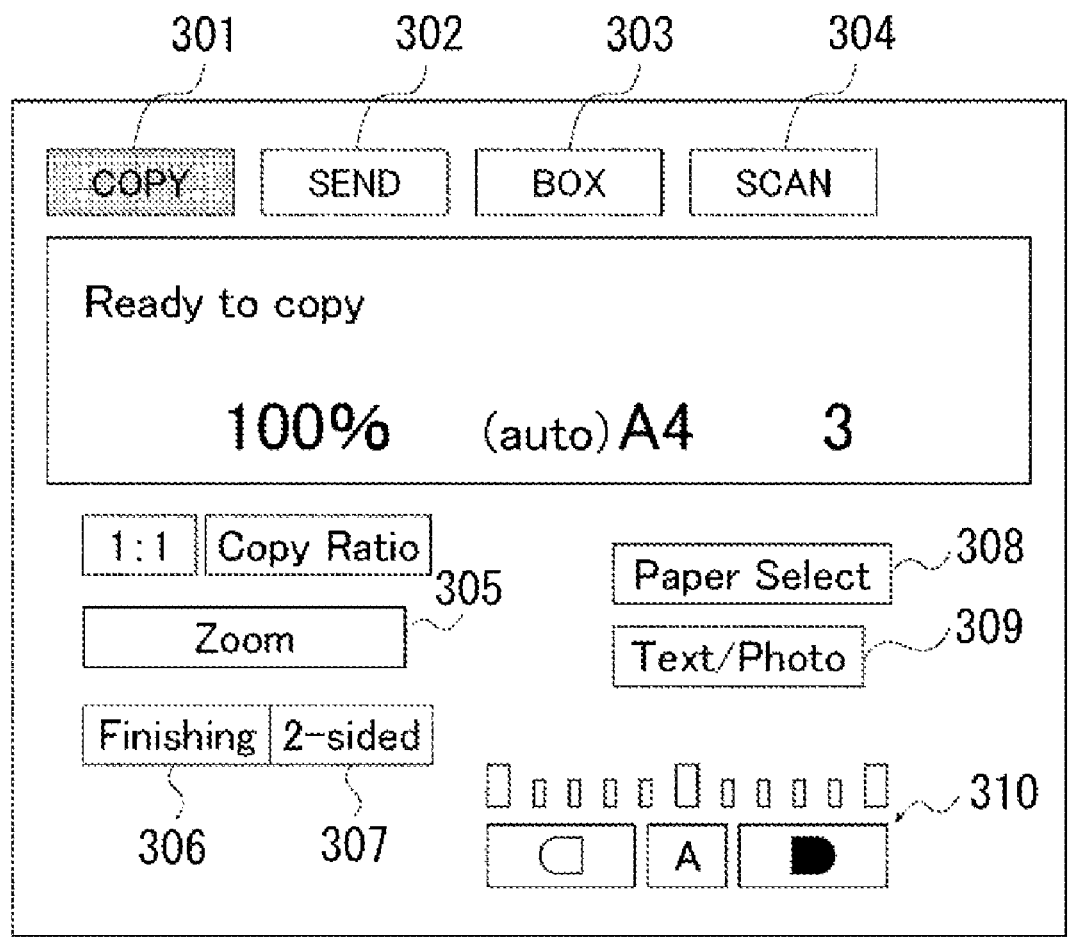
FIG. 3 illustrates a basic COPY screen displayed on the operating unit according to an exemplary embodiment of the present invention.

FIG. 3 shows an operation screen displayed on the liquid crystal panel 200, and shows a basic COPY screen which is displayed as a default screen when the MFP 100 powered-on. The MFP 100 has four modes, that is, a COPY mode, a SEND mode, a BOX mode, and a SCAN mode.

In the COPY mode, copying operations are performed in which an image of the original is read with the scanner 130, the read image is input and the input image is printed with the printer 140. In the SEND mode, image data input from the scanner 130 or image data previously stored in the HDD 114 is transmitted to a destination by an e-mail or the like via the LAN 190 or the Internet. In the BOX mode, various types of data stored in a box are processed (editing, printing, sending, etc.). The box refers to a user box where storage areas on the HDD 114 are assigned to each user. In the SCAN mode, an image of the original is scanned by the scanner 130 and is input, and the image is stored in the box or transmitted through the LAN 190 to the host PC 170.

The above-described modes are switched by selecting an appropriate one from the mode buttons 301 to 304. In the example of FIG. 3, a screen for a case where the COPY mode is selected, is displayed. On the screen, a user performs settings of zoom in/out, selection of a sheet discharging method, double-sided/one-sided printing, selection of a sheet size, text/photograph, and density by operating the buttons 305 to 310.

If the BOX mode button 303 is selected in FIG. 3, a user box list screen (not shown) showing a list of attribute information about user boxes assigned to each user is displayed. When any user box is selected from the user box list displayed on the user box list screen, a file list screen of FIG. 4 is displayed.

Figure 4:
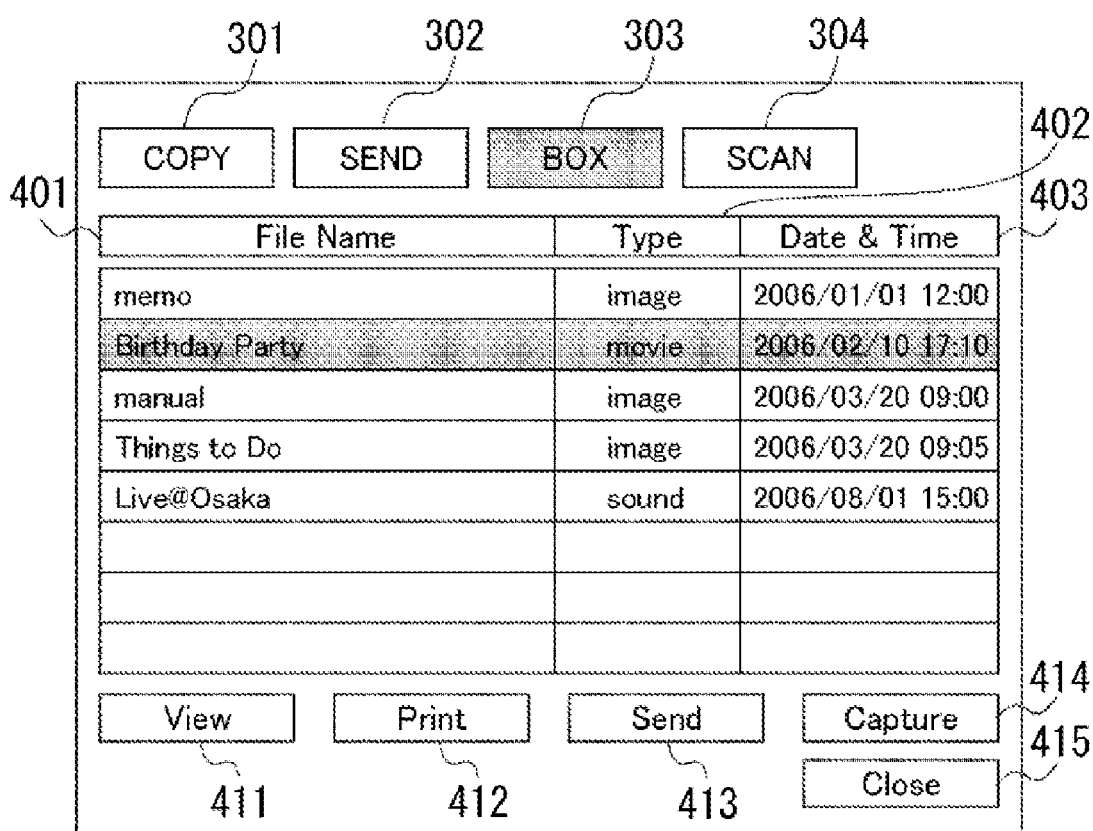
FIG. 4 illustrates a file list screen displayed on the operating unit according to an exemplary embodiment of the present invention.

FIG. 4 shows a file list screen displaying a list of attribute information about files stored in the user box that is selected in the user box list screen. In a file name display field 401, a name of each file is displayed. In a file type display field 402, information indicating a type of each file is displayed. In the HDD 114, not only still image data (image) but also moving image data (movie) or voice data (sound) can be stored. In a storage date and time display field 403, information about date and time when each file is stored in the box is displayed.

In the case where various types of processing are performed to each file stored in the user box, one of the buttons 411 to 414 is pressed while one of the displayed files is selected. Unless at least one file is selected, the buttons 411 to 414 cannot be selected. A target file can be selected by a user who touches an area where a name of the file is displayed. If the file is selected, a background color of an area which shows attribute information of the selected file, is changed to indicate that the file is selected.

In the illustrated example of FIG. 4, moving image data entitled "Birthday Party" is selected. The number of selectable files is not limited to one, and a plurality of files can be selected at a time. If the plurality of files are selected, a background color of areas which show attribute information of each file is changed.

If the display button 411 is selected while any file is selected, contents of the selected file can be checked. More specifically, if the selected file is still image data, a preview of the image is displayed. Further, if the selected file is voice data, a voice sound is output from the speaker 160. If the selected file is moving image data, a moving image is reproduced and displayed, and a voice sound is output from the speaker 160. If a plurality of files are selected, the files are displayed and reproduced in order of selection.

If the print button 412 is pressed while any file is selected, the selected file is printed by the printer 140. However, a file that can be printed in this processing is only still image data. If the moving image data or voice data is selected, a warning message is displayed.

If the send button 413 is selected while any file is selected, the selected file is attached to an e-mail and sent to a designated address. The sending processing can be performed not only to still image data but also to moving image data or voice data. Further, if the plurality of files are selected, the plural files are attached to one e-mail.

(Operation of Extracting and Printing Still Image Data)

If the capture button 414 is pressed while any file is selected, some frames are extracted from the selected moving image data as still image data and printed. A file that can be subjected to this processing is only moving image data. If the still image data or voice data is selected, a warning message is displayed. Further, this processing cannot be performed to a plurality of files at a time. If the plurality of files are selected, a warning message is displayed. In the first exemplary embodiment, a case is described as an example where still image data is extracted from moving image data entitled "Birthday Party" and printed as shown in FIG. 4.

Figure 5:
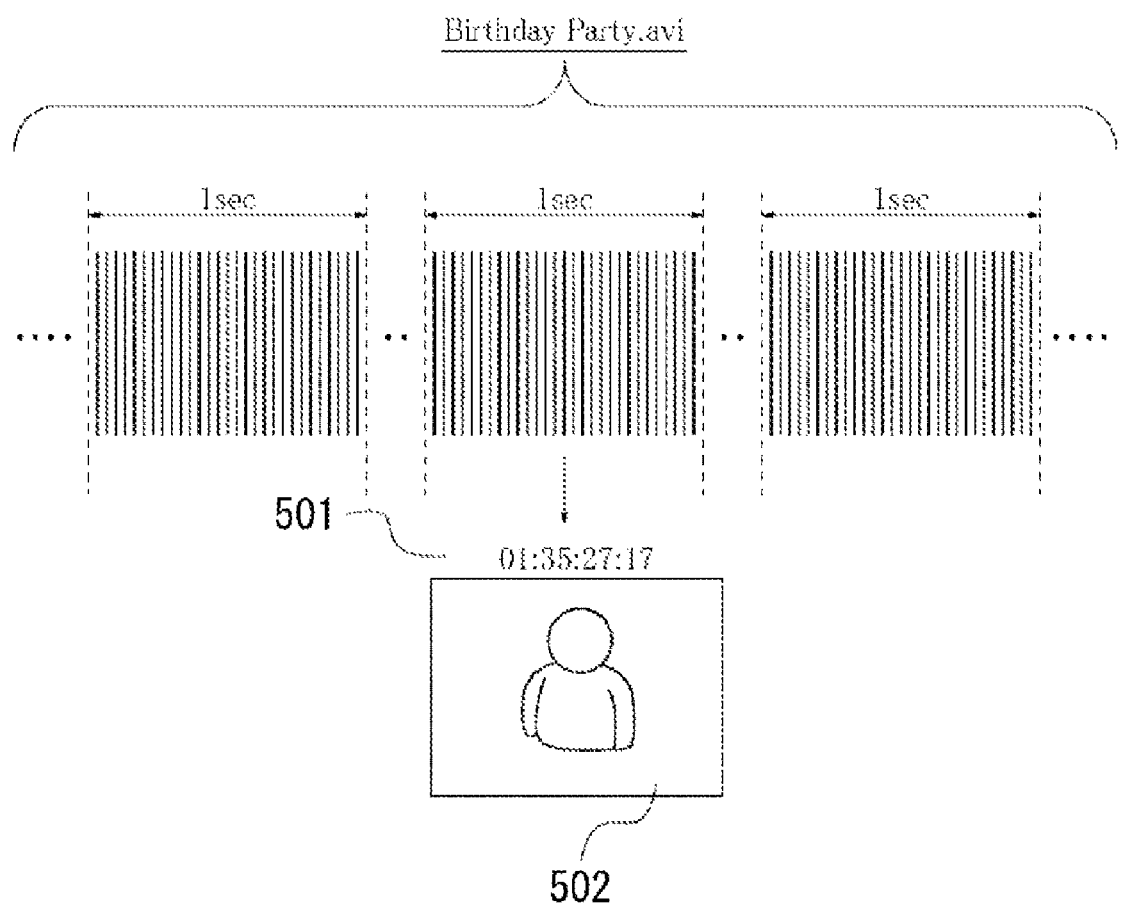
FIG. 5 is a schematic diagram illustrating a structure of moving image data stored in a hard disk drive (HDD) according to an exemplary embodiment of the present invention.

FIG. 5 schematically illustrates a structure of moving image data composed of a plurality of files. In moving image data entitled "Birthday Party.avi" (.avi is a file extension), 30 frames are switched per second (that is, a frame rate of 30), therefore, 30 frames are included in data of one second as shown in FIG. 5.

Figure 6:
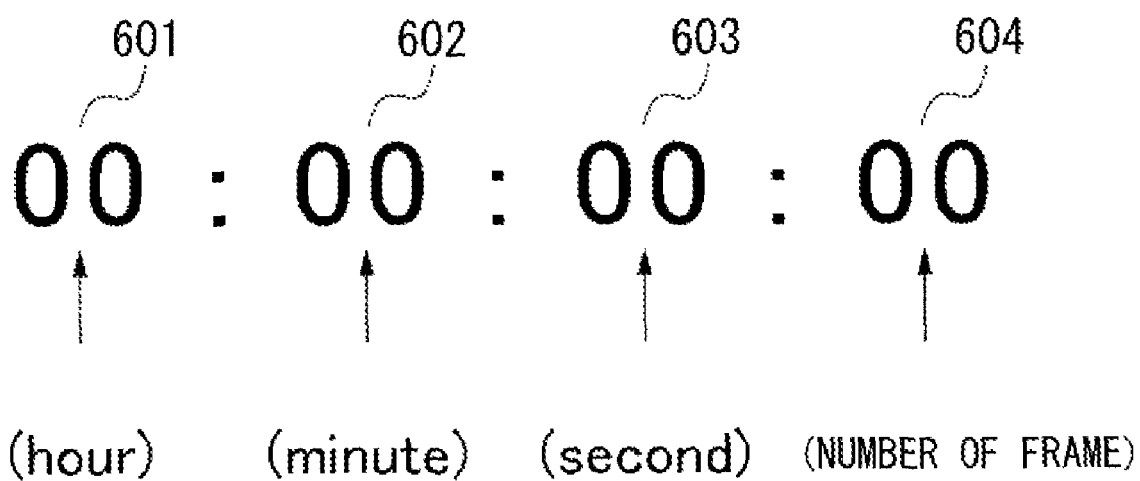
FIG. 6 illustrates time code information according to an exemplary embodiment of the present invention.

In a case where moving image data is replayed, time code information is added to each frame in moving image data based on the time when each frame is reproduced. FIG. 6 is a detailed view illustrating time code information.

As shown in FIG. 6, the time code information is divided into four portions: hour (601), minute (602), second (603), and frame number (604) are illustrated in order from the left side. The frame number 604 is information indicating a frame number from the head in each time of a second. If the frame rate of moving image data is 30, any one of 1 to 30 is displayed. For example, in the case of moving image data having the length of just 120 minutes, time code information of (00:00:01:01) is added to the first frame, and the time code information of (02:00:00:30) is added to the last frame.

Referring to FIG. 5, "Birthday Party.avi" includes the frame 502 having the time code information 501 of (01:35:27:17). The first exemplary embodiment describes the case of extracting the frame 502 as still image data and printing the frame, by way of example.

Figure 7:
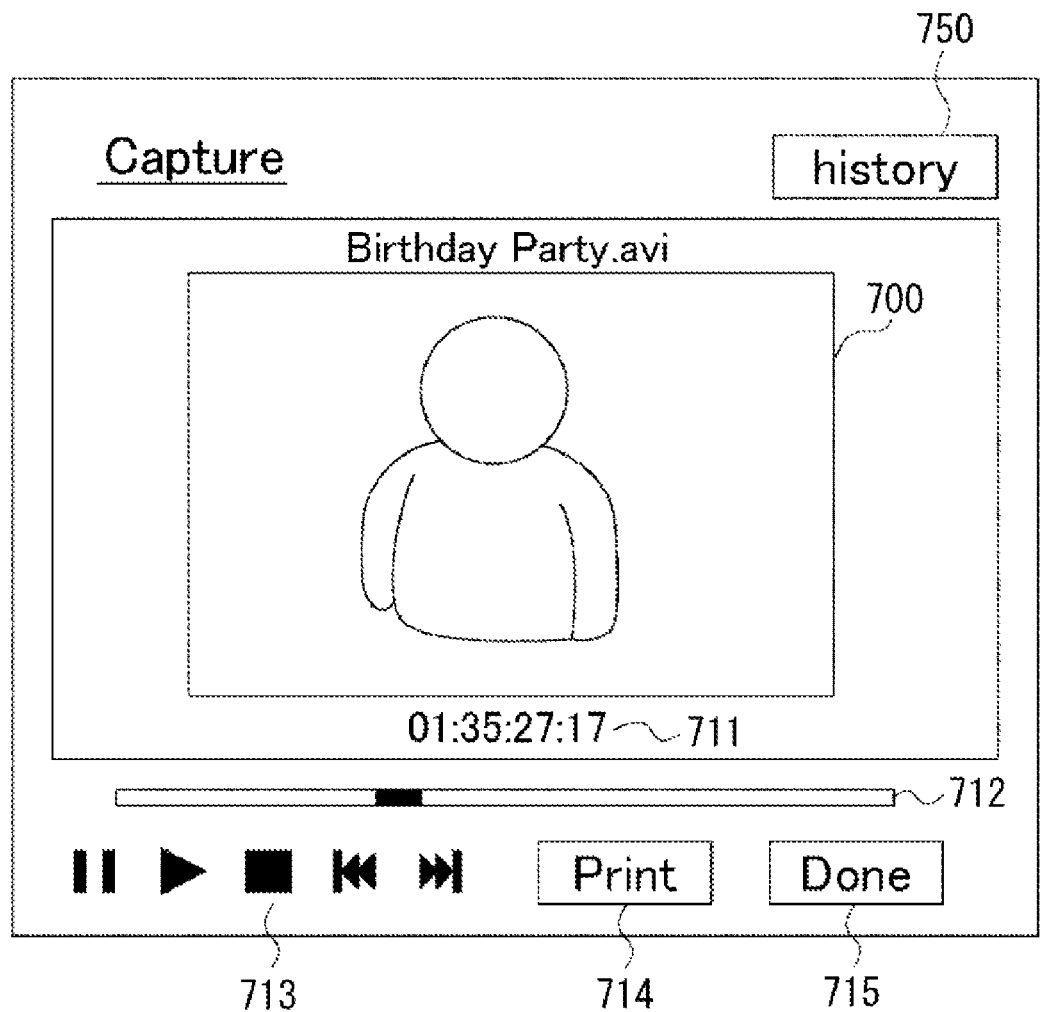
FIG. 7 illustrates a capture instructing screen displayed on the operating unit according to an exemplary embodiment of the present invention.

Referring back to FIG. 4, if the capture button 414 is selected when "Birthday Party" is selected, the capture instructing screen of FIG. 7 is displayed. In FIG. 7, in a moving image data display area 700, images of each frame included in the moving image data are displayed. In a time code information display area 711, time code information corresponding to the frame displayed in the moving image data display area 700 is displayed. A seek bar 712 indicates a position of a frame displayed in the moving image data display area 700, relative to the whole moving image data. A history button 750 will be described below.

A user selects each button from the button group 713 to instruct playback, stop, fast-forward, fast-reverse, and frame advance to retrieve an image of a frame to be printed. To select a frame that is to be extracted and printed as still image data, reproduction of moving image data is stopped while a desired frame is displayed in the moving image data display area 700, and a print button 714 is pressed.

When the print button 714 is pressed, the displayed frame is extracted as still image data and expanded to image data for printing as needed, and printed by the printer 140. Then, when the printing processing is thus executed, history information indicating that the printing processing has been performed is managed in association with the extracted frame.

Figure 8:
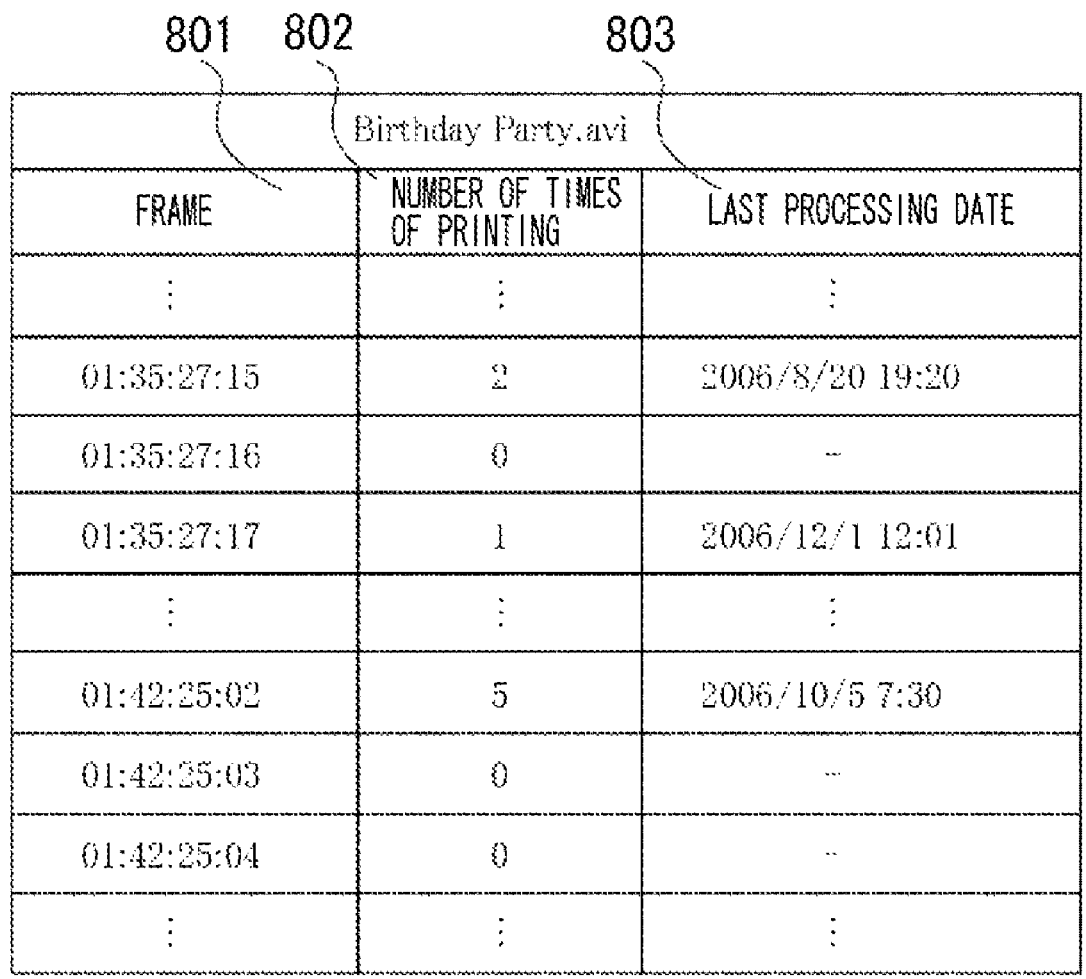
FIG. 8 illustrates a history information table according to an exemplary embodiment of the present invention.

FIG. 8 is a history information table indicating that a frame is extracted and printed as still image data, in association with each frame included in moving image data. The history information table is stored in the memory 120, and managed for each moving image data stored in the HDD 114. In this example, moving image data stored in the HDD 114 and the history information table stored in the memory 120 are separately managed, but the history information table can be embedded to each moving image data and managed. In such a case, even when the moving image data is transferred to another device, the history information can be taken over and managed, which further increases usability.

In a field 801 of the history information table, time code information corresponding to each frame is input. As described above, time code information for uniquely identifying a frame is added to each frame in the moving image data. Here, a frame is identified based on the time code information, and an execution history of the printing processing is managed. However, any information other than time code information can also be used as long as a frame in the moving image data can be uniquely identified. For example, a method such as assigning serial numbers to the frames can be adopted.

In the field 802 of the history information table, information indicating the number of times that a frame is extracted as still image data and printed, is input for each frame. In the field 803, information indicating the date and time when a printed frame was finally printed, is input. Information managed in the field 802 and the field 803 is used in displaying a particular frame as a candidate when a frame to be processed is selected as described below.

Figure 9:
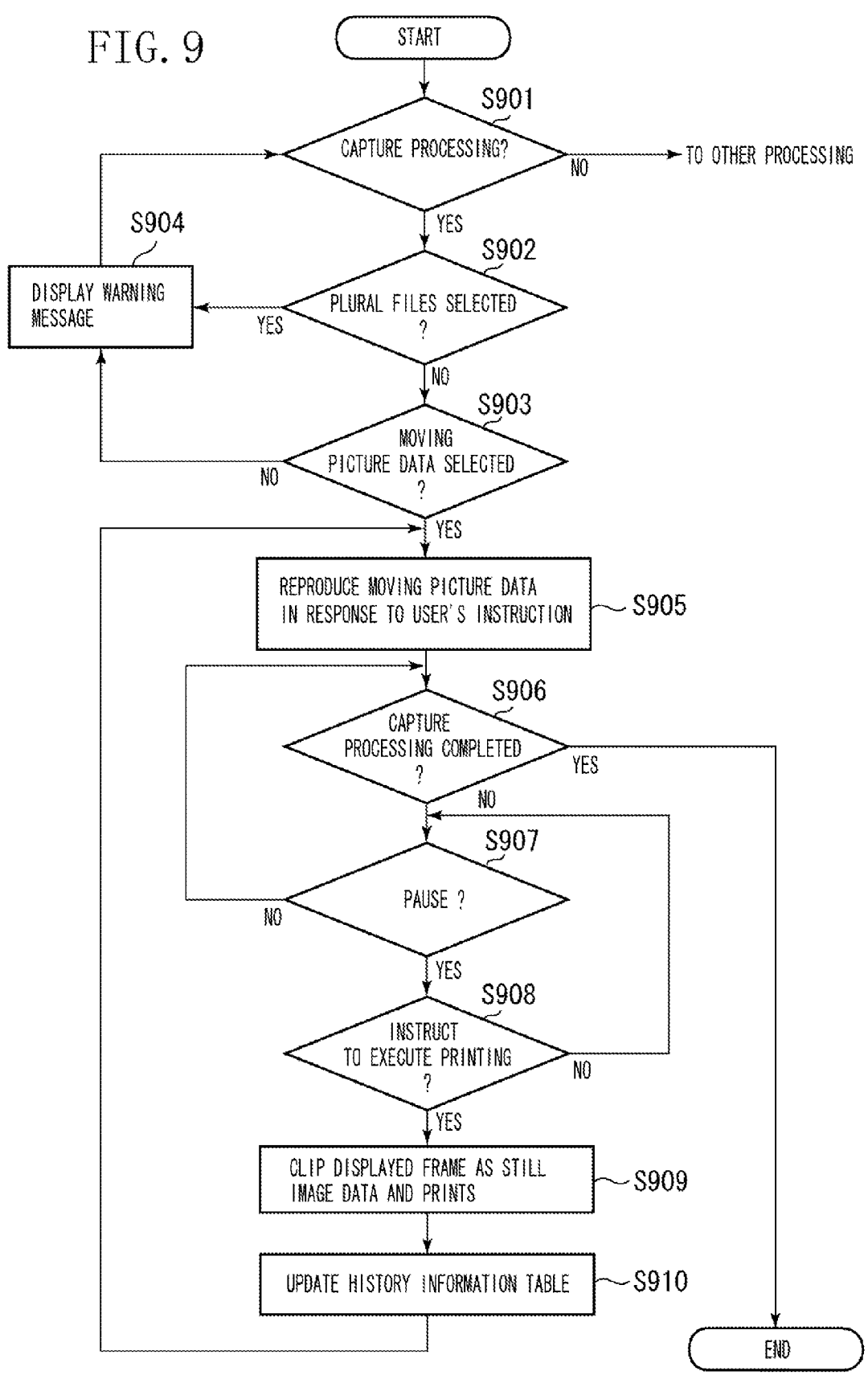
FIG. 9 is a flowchart of an operation for clipping and printing still image data according to an exemplary embodiment of the present invention.

FIG. 9 is a flowchart illustrating a series of processing for extracting and printing a frame in moving image data as still image data. The series of processing of this flowchart is controlled by the CPU 111 of the control unit 110 in accordance with programs stored in the HDD 114.

First, in step S901, it is determined whether capture processing is instructed by a user. More specifically, if the capture button 414 of FIG. 4 is selected, the process advances to step S902. If other buttons are selected, processing corresponding to the selected button is performed.

In step S902, it is determined whether a plurality of files are selected on the screen of FIG. 4. If it is determined that only one file is selected, the process advances to a subsequent step S903 to determine whether the selected file is moving data. If the selected file is moving image data, the process advances to step S905.

If it is determined that the plurality of files are selected in step S902 or a file other than the moving image data is selected in step S903, the process advances to step S904 to display a warning message and then returns to step S901.

In step S905, selected moving image data is displayed by performing playback, stop, pause, fast-forward, fast-reverse, or frame-advance in accordance with instructions of a user using the button group 713. In a subsequent step S906, it is determined whether an instruction to end capture processing is sent from a user. More specifically, if it is detected that a done button 715 of FIG. 7 is pressed, it is determined that a user sends an instruction to end the capture processing, and the capture processing ends. On the other hand, if a user does not send an instruction to end the capture processing, the process advances to step S907.

In step S907, it is determined whether a user has sent an instruction to pause playback of moving image data. The pause refers to a state where a particular frame is reproduced and paused while being displayed. If a predetermined time is elapsed after pause is instructed while capture processing is not instructed, the pause is automatically cancelled. The capture processing will be described later.

In step S907, if it is determined that the pause is instructed by a user, the process advances to step S908 to determine whether a user has sent an instruction to perform printing processing. More specifically, if the print button 714 is pressed in the screen of FIG. 7, it is determined that a user has sent an instruction to perform printing processing, and the processing advances to step S909. If the user has not sent an instruction to perform the printing processing, the processing returns to step S907 and waits until a user presses the print button 714.

In step S908, if it is determined that a user has sent an instruction to perform printing processing, the process advances to step S909. In step S909, an image of a displayed frame is clipped as still image data and printed by the printer 140. In a subsequent step S910, in the history information table of FIG. 8, information about the number of times that a frame subjected to printing processing is printed and information about date and time when the frame is finally printed, are updated. Then, the process returns to step S905 to restart reproduction of moving image data.

Further, a user can also select a frame to be extracted as still image data by a method other than the above method in which a frame is selected while reproducing the moving image data. For example, a user can directly input time code information and extract a frame corresponding to the input time code information as still image data. Furthermore, any other methods can also be used as long as a frame in the moving image data can be selected.

(Frame Selecting Operation)

Next, an operation is described in which a frame that has been subjected to printing processing before, is extracted and displayed as a candidate on the liquid crystal panel 200 when a user selects a frame to be printed from a plurality of frames in moving image data.

Figure 10:
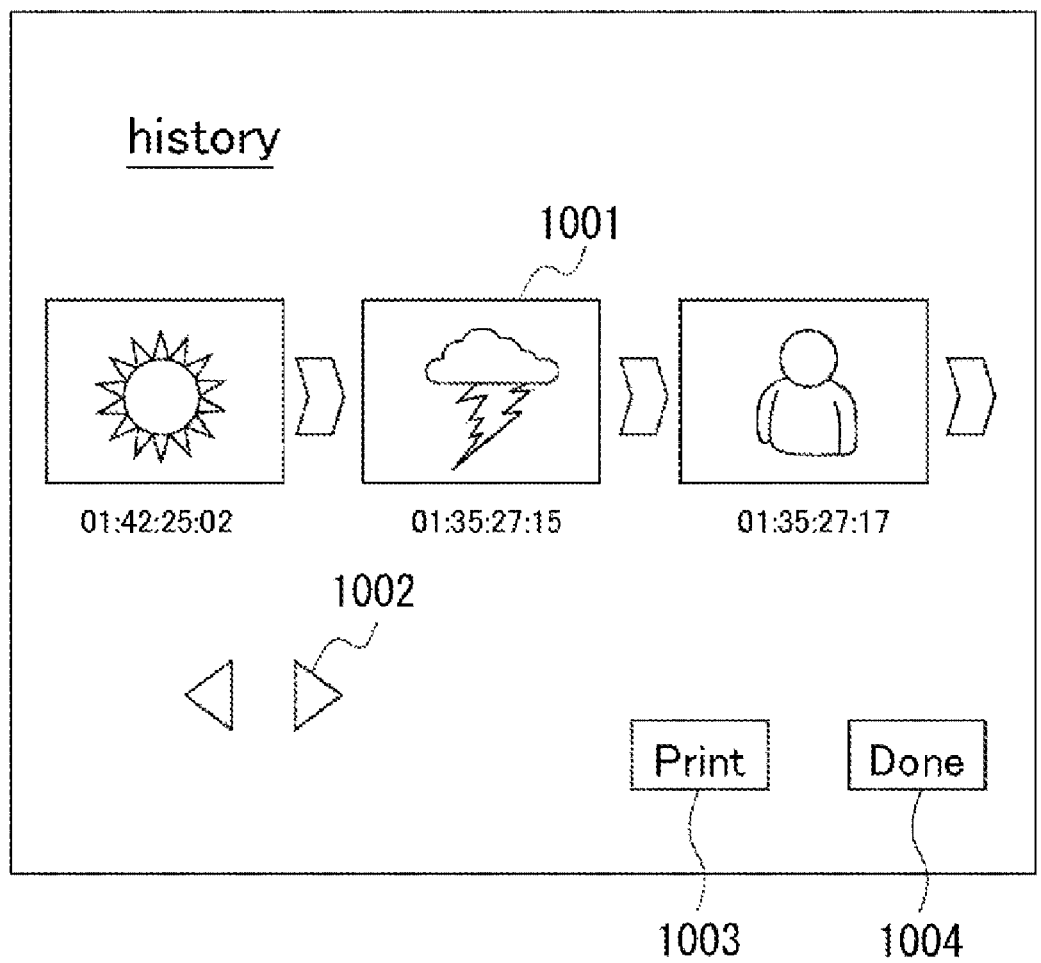
FIG. 10 illustrates a frame selecting screen displayed on the operating unit according to an exemplary embodiment of the present invention.

FIG. 10 illustrates a frame selecting screen which is displayed when the history button 750 displayed on the capture instructing screen of FIG. 7 is pressed. In a region 1001, images of a frame extracted with reference to the history information table of FIG. 8 are listed in a thumbnail form. At this time, a preview of a reduced image is displayed to check an image of each frame. A user can select a desired frame from frames displayed as candidates. Thus, if an image of the frame that has been printed before, is to be printed again, the operation of retrieving the frame is not repeated, which improves operational efficiency.

Further, if there are a plurality of files that have been subjected to printing processing before, the CPU 111 performs control to rearrange frames in consideration of priority of each frame. More specifically, frames are rearranged in turn starting from the frame that has been most frequently printed, based on information about the number of times that the frame is printed. The number of times is input in the field 802 of the history information table of FIG. 8. Further, based on the information about the final execution date and time input into the field 803 of the history display table, the frames can be rearranged starting from the latest printed one. Thus, the frames are rearranged and displayed in consideration of priority so that a frame that a user most likely selects, can be selected which further increases usability.

If frames to be displayed as candidates are large in number, images of frames which are not displayed, can be displayed using a scroll key 1002. If an image to be printed is found, the image is printed using the printer 140 by pressing the print button 1003 while the desired frame is selected.

Figure 11:
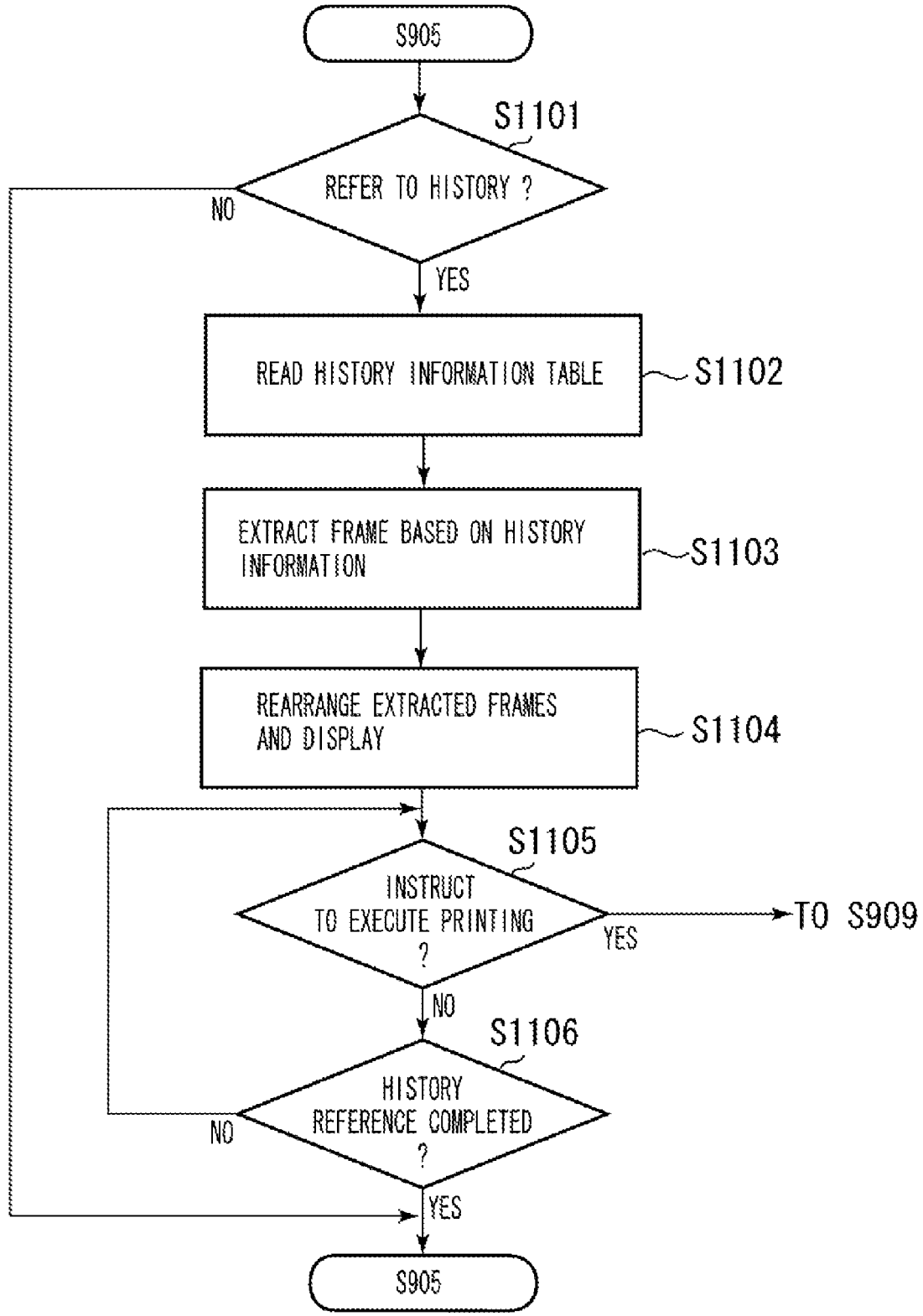
FIG. 11 is a flowchart of an operation for extracting and displaying a frame as a candidate based on history information according to an exemplary embodiment of the present invention.

FIG. 11 is a flowchart illustrating a series of processing for extracting a frame that has been printed before and displaying the frame as a candidate when a user selects a frame to be printed from moving image data. The series of processing in the flowchart is controlled by the CPU 111 of the control unit 110 in accordance with programs stored in the HDD 114.

The flowchart of FIG. 11 illustrates an operation executed in step S905 of the flowchart of FIG. 9. That is, determination and operations in step S1101 and subsequent steps are performed while moving image data is reproduced in step S905.

In step S1101, it is determined whether a user has sent an instruction to refer to history information. More specifically, if it is detected that the history button 750 of FIG. 7 is pressed, the process advances to step S1102. If the history button 750 is not selected, the process returns to step S905.

In step S1102, the history information table of FIG. 8 is read from the memory 120. In a subsequent step S1103, a frame is extracted that has been printed before, from a plurality of frames in moving image data with reference to the history information table read in step S1102. Then, in step S1104, extracted frames are rearranged based on a priority (i.e., the number of printing processing or date and time when the printing processing is executed) and displayed on the liquid crystal panel 200.

In step S1105, it is determined whether a user has sent an instruction to perform printing processing on a frame selected and displayed as a candidate. More specifically, if it is detected that the print button 1003 of FIG. 10 is pressed, the process advances to step S909 of FIG. 9. If the print button 1003 is not pressed, the process advances to step S1106, and it is determined whether a user has sent an instruction to end reference of the history information.

More specifically, if it is detected that the done button 1004 of FIG. 10 is pressed, it is determined that a user has sent an instruction to end reference of the history information, and the processing returns to step S905. On the other hand, if the done button 1003 is not pressed, the control returns to step S1105.

As described above, in the first exemplary embodiment, if a frame in the moving image data is extracted as still image data and printed, information indicating that the printing processing is performed, is managed in association with the frame. As a result, if a user selects a frame to be printed from a plurality of frames in the moving image data, a frame that has been previously printed, can be extracted and displayed as a candidate, which improves usability.

Further, in the first exemplary embodiment, information indicating the number of printing and information indicating the date and time when the printing processing was finally performed, are managed in association with each frame in the moving image data. Accordingly, frames that are to be displayed as candidates can be rearranged and displayed considering priority. As a result, even if many frames are displayed as candidates, a frame that a user is most likely to select, can be preferentially presented to the user, which further improves usability.

Second Exemplary Embodiment

Next, a second exemplary embodiment of the present invention is described. The second exemplary embodiment differs from the first exemplary embodiment in that the history information described in the first exemplary embodiment is managed together with user ID information for identifying a user that instructs execution of printing processing. In the second exemplary embodiment, frames to be displayed as candidates are extracted based on the execution history information about printing processing, using the user ID information. The execution history information is managed for each user. The basic configuration of the second exemplary embodiment is similar to the first exemplary embodiment, accordingly, detailed description thereof is not repeated here, and a difference between the second exemplary embodiment and the first exemplary embodiment is described.

In the second exemplary embodiment, a user first enters a user ID and password preset for each user in a log-in screen (not shown) displayed on the liquid crystal panel 200, and presses a log-in key in the hard key group 203 when the MFP 100 is operated. As a result, a user who operates the MFP 100 can be identified by the CPU 111.

The operation of extracting still image data from moving image data and printing the data in the second exemplary embodiment is the same as that in the flowcharts of FIGS. 9 and 11. However, in the second exemplary embodiment, contents of the history information table updated in step S910 of FIG. 9 is different from the first exemplary embodiment.

Figure 12:
FIG. 12 illustrates a history information table according to an exemplary embodiment of the present invention.

FIG. 12 illustrates an example of a history information table of the second exemplary embodiment. The history information table of FIG. 12 differs from the history information table of FIG. 8 in that the user ID information (field 1202) for identifying a user who instructs each printing processing is managed. Further, in the history information table of FIG. 12, a record is newly created and added each time the printing processing is performed, instead of creating records of all frames in the beginning.

Then, according to the second exemplary embodiment, in step S1103 of the flowchart of FIG. 11, only history information of a frame which the user instructs to print is extracted using a user ID that is the same as the user ID of the user who performs operations, from the history information table of FIG. 12. Then, a frame that is to be displayed as a candidate is determined.

As described above, in the second exemplary embodiment, a user ID for identifying a user who instructs extraction of a frame from moving image data and execution of printing, is managed as history information. Thus, even if a plurality of users shares the MFP 100, a frame that the user has instructed to print, is distinguished from frames that another user has instructed to print and is displayed as a candidate, which further improves usability.

Third Exemplary Embodiment

Next, a third exemplary embodiment of the present invention is described. The third exemplary embodiment differs from the first exemplary embodiment in that the first exemplary embodiment describes only the processing of printing extracted still image data, but in the third exemplary embodiment, different types of processing can be performed to the extracted still image data.

Further, in the third exemplary embodiment, information indicating a type of processing performed to the extracted still image data is managed as history information. The basic configuration of the third exemplary embodiment is the same as the first exemplary embodiment, accordingly, detailed description thereof is not repeated here, and only a difference between the third exemplary embodiment and the first exemplary embodiment is described.

Figure 13:
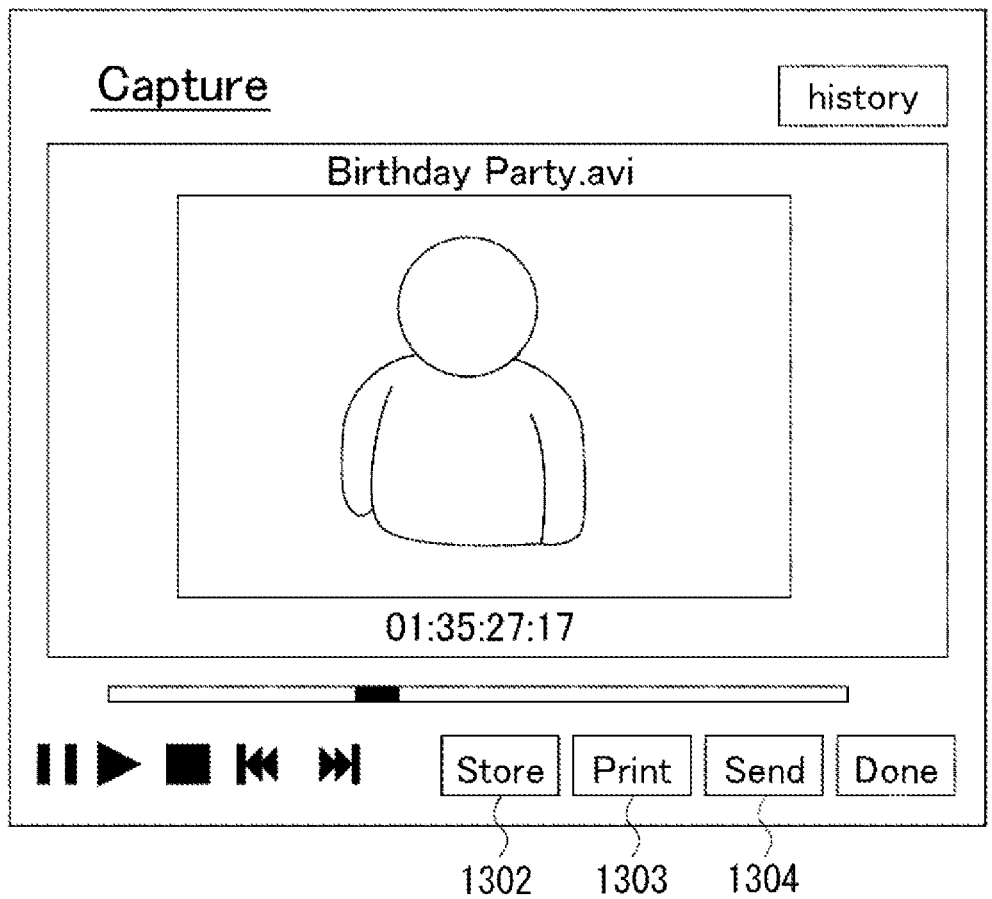
FIG. 13 illustrates a capture instructing screen displayed on the operating unit according to an exemplary embodiment of the present invention.

FIG. 13 illustrates a capture instructing screen that is displayed when the capture button 414 of FIG. 4 is pressed. As compared with the capture instructing screen of FIG. 7, in the capture instructing screen of FIG. 13, a save button 1302 and a send button 1304 are added.

When one of the buttons 1302 to 1304 is selected, a frame displayed on the moving image data display area 700 is extracted as still image data, and processing corresponding to the selected button is performed.

If the save button 1302 is pressed, the extracted still image data is saved in the user box where the original moving image data (in this case, "Birthday Party.avi") is stored. The extracted still image data can be stored in a user box that is different from that of the original moving image data.

If the print button 1303 is pressed, as described in the first exemplary embodiment, the extracted still image data is printed by the printer 140.

If the send button 1304 is pressed, the extracted still image data is converted to a format compliant with an e-mail, and added to the e-mail as an attached file. Then, the e-mail to which the still image data is attached, is sent to an address designated by a user through the network I/F 116 and the LAN 190.

Thus, in the third exemplary embodiment, different types of processing can be performed to the extracted still image data. Moreover, history information including information indicating a type of performed processing is managed. Accordingly, the history information indicates that the processing was performed.

FIG. 14 is a history information table according to the third exemplary embodiment. The history information table of FIG. 14 differs from the history information table of FIG. 8 in that information (field 1402) for identifying each type of executed processing is managed. Further, in the history information table of FIG. 14, a record is newly created in the history information table each time the printing processing is performed.

Figure 15:
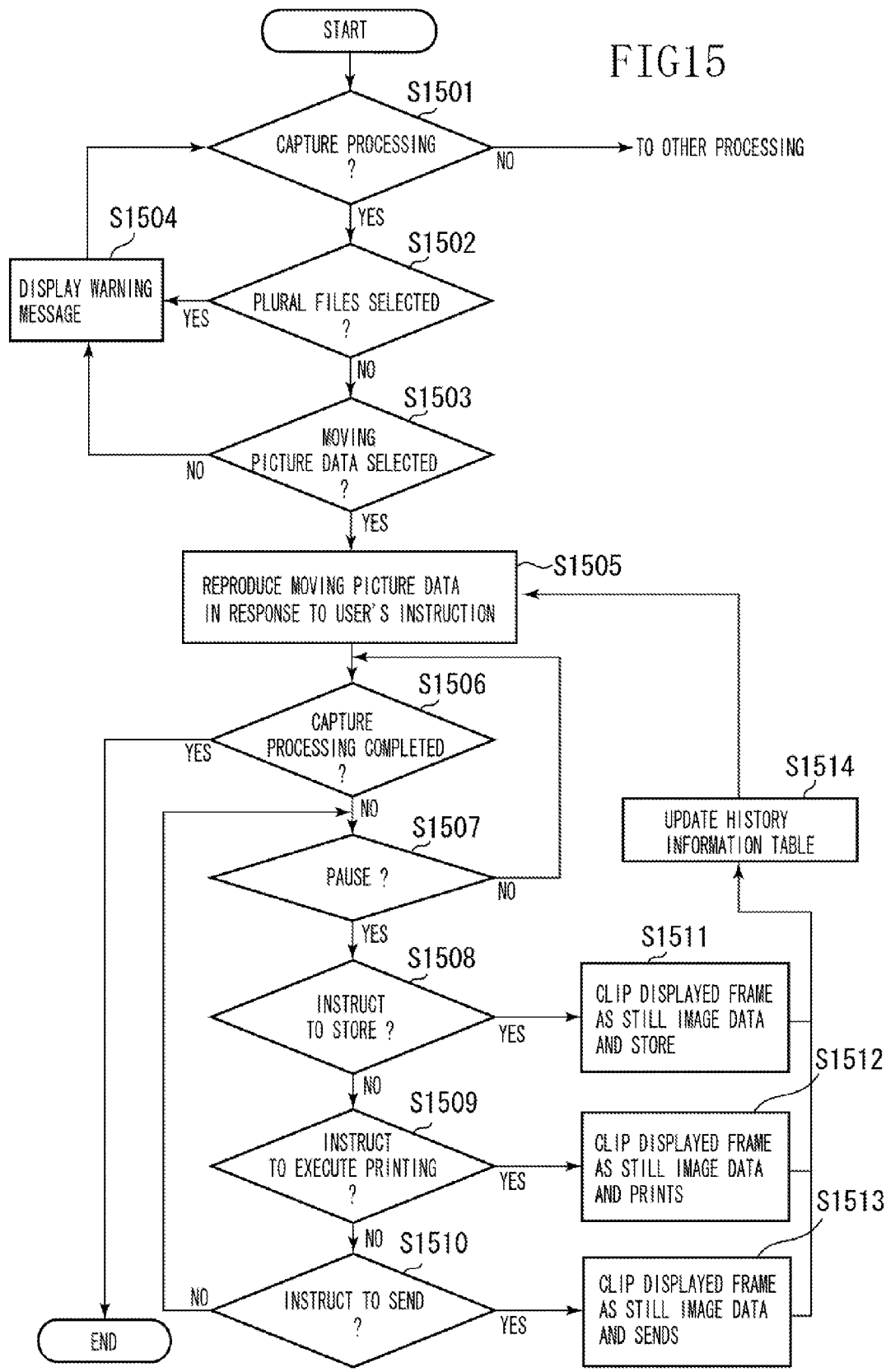
FIG. 15 is a flowchart of an operation for clipping still image data and performing processing according to an exemplary embodiment of the present invention.

FIG. 15 is a flowchart illustrating a series of processing for extracting frames in the moving image data as still image data. The series of processing in this flowchart is controlled by the CPU 111 of the control unit 110 in accordance with programs stored in the HDD 114. Steps S1501 to S1507 of FIG. 15 are similar to steps S901 to S907 of FIG. 9, and description thereof is not repeated here.

In step S1508, it is determined whether a user instructs saving. More specifically, if the save button 1302 is pressed in the screen of FIG. 13, it is determined that a user instructs the saving, and the process advances to step S1511. In step S1511, an displayed image of a frame is clipped as still image data and saved in a user box where the original moving image data is stored.

If a user does not instruct saving in step S1508, the process advances to step S1509 to determine whether the user instructs printing. More specifically, if the print button 1303 is pressed in the screen of FIG. 13, it is determined that a user instructs printing, and the process advances to step S1512. In step S1512, images of a displayed frame are clipped and printed by the printer 140.

In step S1509, if it is determined that a user does not instruct printing, the process advances to step S1510 to determine whether a user instructs sending. More specifically, if the send button 1304 is pressed in the screen of FIG. 13, it is determined that a user instructs sending, and the process advances to step S1513. In step S1513, images of a displayed frame are clipped as still image data, and attached to an e-mail and sent to an address designated by the user.

In step S1514, in the history information table of FIG. 14, information about a type of processing and information about date and time when the processing is executed are updated in association with a frame subjected to each processing. Then, the control returns to step S1505 to restart reproduction of the moving image data.

Figure 16:
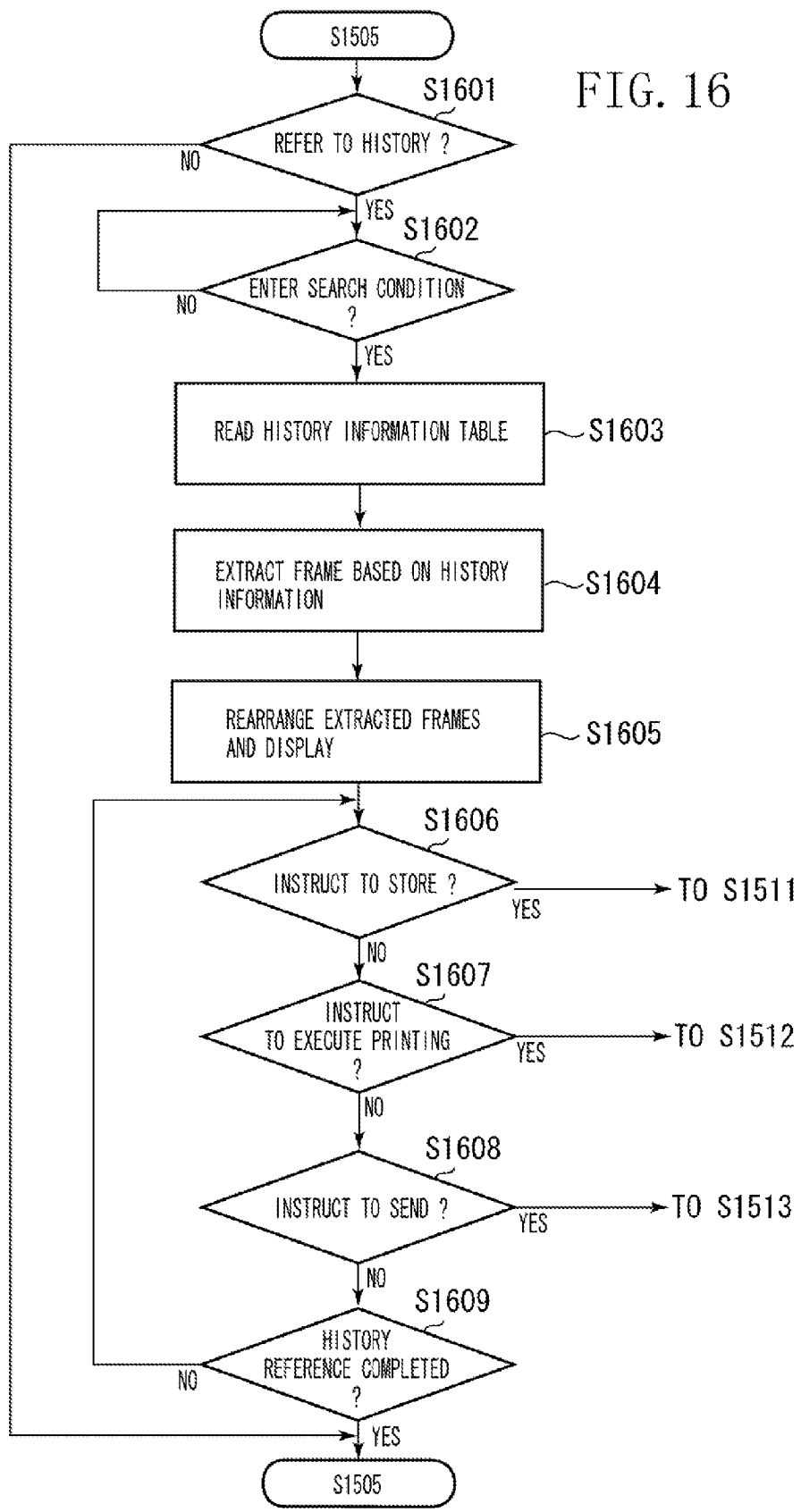
FIG. 16 is a flowchart of an operation for extracting and displaying a frame as a candidate based on history information according to an exemplary embodiment of the present invention.

FIG. 16 is a flowchart illustrating a series of processing for extracting a frame and displaying the frame as a candidate when a user selects a frame which is to be extracted from moving image data and subjected to processing. The series of processing is controlled by the CPU 111 of the control unit 110 in accordance with programs stored in the HDD 114.

A flowchart of FIG. 16 illustrates operations executed in step S1505 of the flowchart of FIG. 15. That is, determination and operations of step S1601 and subsequent steps are performed while the moving image data is reproduced in step S1505.

In step S1601, it is determined whether a user instructs reference of the history information. More specifically, if it is detected that the history button 750 of FIG. 7 is pressed, the process advances to step S1602. If the history button 750 is not pressed, the process returns to step S1505.

In step S1602, conditions for retrieving history information when a frame to be displayed is extracted as a candidate, are input. That is, in the third exemplary embodiment, processing such as save, print, and send are distinguished from each other, and history information of executed processing is managed. Then, for example, if a frame that has been subjected to sending processing is selected by a user, "send" is input as a search condition to retrieve execution history information about the sending processing and a frame is extracted that has been subjected to the sending processing.

Since steps S1603 to S1605 are similar to the steps S1102 to S1104 of FIG. 11, description thereof is not repeated here.

In steps S1606 to S1608, if anyone of frames displayed as candidates is selected, it is determined whether a user instructs execution of the processing. More specifically, in the third exemplary embodiment, in addition to the print button 1003 of the frame selecting screen of FIG. 10, the save button and the send button are provided so that it is determined whether any of these buttons is pressed. Then, if a user instructs any of saving, printing and sending processing, the process advances to one of the steps S1511 to step S1513 to perform the processing.

If a user does not instruct any processing, the process advances to step S1609, and it is determined whether a user sends an instruction to end reference of the history information, namely whether the done button 1004 of FIG. 10 is pressed. If the reference of the history information is ended, the process returns to step S1505.

As described above, in the third exemplary embodiment, a plurality of types of processing can be performed to still image data extracted from the moving image data. Moreover, information indicating a type of executed processing can be managed together with the history information indicating that the processing was performed.

As a result, at the time of extracting a frame to be displayed as a candidate, a user inputs search conditions for identifying a type of processing that has been performed, and a frame that has been subjected to processing that matches with the conditions, can be extracted distinctly from the other frames.

The functions described in the first to third exemplary embodiments can be singly provided or used in combination.

Other Exemplary Embodiment

The exemplary embodiments are described above in detail, but the present invention allows another embodiment of a system, an apparatus, a method, a program, or a storage medium (recording medium). More specifically, the present invention is applicable to a system configured by a plurality of devices, or an apparatus composed of one device.

According to the present invention, software programs for executing the above functions of the exemplary embodiments (programs corresponding to the flowcharts in the exemplary embodiments) are directly or remotely supplied to a system or an apparatus. Then, a program code is read and executed by a computer of the system or apparatus according to the present invention.

Thus, the present invention is embodied by a program code itself installed to the computer to cause the computer to execute functional processing of the present invention. That is, the present invention includes a computer program itself for realizing the functional processing of the present invention.

In this case, if the program function is implemented, the other forms such as an object code, a program executed by an interpreter, and script data supplied to an OS can be used.

Recording mediums for supplying a program include a floppy® disk, a hard disk, an optical disk, a magneto optical disk, a MO, a CD-ROM, a CD-R, a CD-RW, a magnetic tape, a nonvolatile memory card, a ROM, and a DVD (DVD-ROM, DVD-R).

Besides, as a method of supplying a program, a program can be supplied by downloading the program from an Internet website to a recording medium such as a hard disk using a browser of a client computer. That is, the website is accessed to download a computer program itself of the present invention or a compressed file including an automatic installing function from the website. Further, program codes constituting a program of the present invention are divided into a plurality of files, and the files are downloaded from different websites. That is, a WWW server for downloading program files for causing a computer to perform functional processing of the present invention to a plurality of users is encompassed in the scope of the present invention.

Further, a program of the present invention is encoded and stored in a storage medium such as a CD-ROM, and transferred to users. Then, a user who satisfies a predetermined condition is allowed to download key information for decoding through the Internet from the website. Then, the encoded program can be executed using the key information and installed to the computer to perform the processing.

Further, the computer executes a read program to perform the above functions of the exemplary embodiment. In addition, an OS running on the computer performs a part or all of actual processing in accordance with an instruction of the program, and the functions of the exemplary embodiments can be performed through this processing.

Further, the functions of the exemplary embodiments are realized after a program read from the recording medium is written to a memory including an expansion board inserted to a commuter or an expansion unit connected to the computer. Then, the functions of the exemplary embodiments are realized by a CPU in the expansion board or expansion unit executing a part or all of the actual processing in accordance with an instruction of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-343048 filed Dec. 20, 2006, which is hereby incorporated by reference herein in its entirety.

What is claimed is:

1. An image processing apparatus comprising:
a memory unit configured to store moving image data;
a processing unit configured to be able to perform a plurality of types of processing;
a first selecting unit configured to select at least one frame from a plurality of frames included in the moving image data stored in the memory unit;
a second selecting unit configured to select a type of processing that is to be performed by the processing unit from among the plurality of types of processing, wherein the plurality of types of processing includes at least a print process in which the selected frame is printed by a printing unit and a transmission process in which the selected frame is transmitted to an external apparatus;
a control unit configured to control the processing unit to perform the selected type of processing to the selected frame; and
a management unit configured to manage history information indicating the frame to which the processing is performed by the processing unit and the type of the performed processing,
wherein, when a user designates one of the plurality of types of processing as a retrieval condition, at least one frame to which the designated processing is previously performed is presented to the user according to the history information managed by the management unit, while other frames are not presented.

2. The image processing apparatus according to claim 1, wherein the plurality of types of processing performed by the processing unit further includes a storing processor in which the selected frame is stored in the memory unit as a still image data.

3. The image processing apparatus according to claim 1, wherein the management unit further manages information indicating a user who has instructed the processing, as the history information.

4. The image processing apparatus according to claim 1, wherein the management unit further manages information indicating the number of times that the processing is performed by the processing unit, as the history information.

5. A method comprising:
performing a first selection to select at least one frame from a plurality of frames included in moving image data;
performing a second selection to select a type of processing that is to be performed to the frame selected through the first selection from among a plurality of types of processing, wherein the plurality of types of processing includes at least a print process in which the selected frame is printed by a printing unit and a transmission process in which the selected frame is transmitted to an external apparatus;
performing the type of processing selected through the second selection to the frame selected through the first selection; and
managing history information indicating the frame to which the processing is performed and the type of the processing performed to the frame,
wherein, when a user designates one of the plurality of types of processing as a retrieval condition, at least one frame to which the designated processing is previously performed is presented to the user according to the managed history information, while other frames are not presented.

6. The method according to claim 5, wherein the plurality of types of processing further includes a storing process in which the frame selected through the first selection is stored in a memory unit as a still image data.

7. The method according to claim 5, wherein the management further includes managing of information indicating a user who has instructed the processing, as the history information.

8. The method according to claim 5, wherein the management further includes managing of information indicating the number of times that the processing is performed, as the history information.

9. The method according to claim 5, wherein the method is performed by an image processing apparatus including a memory unit to store the moving data.

10. A non-transitory computer-readable storage medium having a program stored thereon for causing an apparatus to perform the method according to claim 5.

* * * * *